Nov. 26, 1940.  E. G. LITTLE  2,223,217

FLEXIBLE COUPLING

Filed Oct. 5, 1938

INVENTOR
Edwin G. Little.
BY
HIS ATTORNEY

Patented Nov. 26, 1940

2,223,217

UNITED STATES PATENT OFFICE 2,223,217

FLEXIBLE COUPLING

Edwin G. Little, Wilkinsburg, Pa., assignor to The Union Switch & Signal Company, Swissvale, Pa., a corporation of Pennsylvania Application October 5, 1938, Serial No. 233,437

5 Claims. (Cl. 192—8)

My invention relates to a flexible coupling for transmitting mechanical power from one member to another.

One object of my invention is to provide a flexible coupling whereby two abutting shafts can be connected together in such manner that the one shaft can drive the other shaft in one direction and the other shaft can drive the one shaft in the opposite direction, but that any rotational effort which is applied directly to either shaft tending to rotate it in the direction it is driven by the other shaft will be automatically resisted by suitable braking means which is incorporated in the coupling.

Couplings embodying my invention are particularly suitable for, although in no way limited to, use for connecting a highway crossing gate arm which is biased to a lowered or traffic obstructing position, with a motor driven mechanism for moving it to a raised or non-traffic obstructing position, and the primary function of the coupling when used in this manner is to prevent the gate arm counterweight from dropping suddenly and thereby causing damage to the operating mechanism, in the event that the gate arm becomes broken while it is in its lowered or traffic obstructing position.

Other objects and characteristic features of my invention will appear as the description proceeds.

I shall describe one form of coupling embodying my invention, and shall then point out the novel features thereof in claims.

Figure 2:
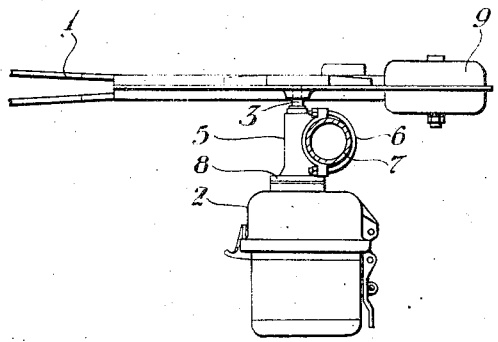
Figure 1:
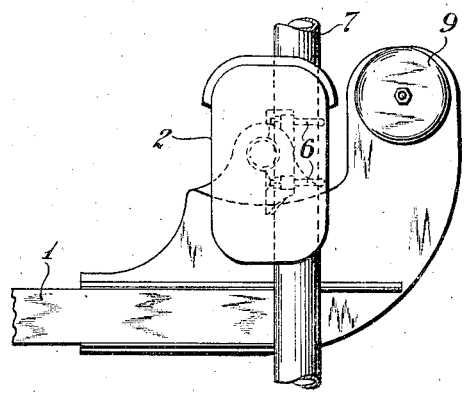
Figure 3:
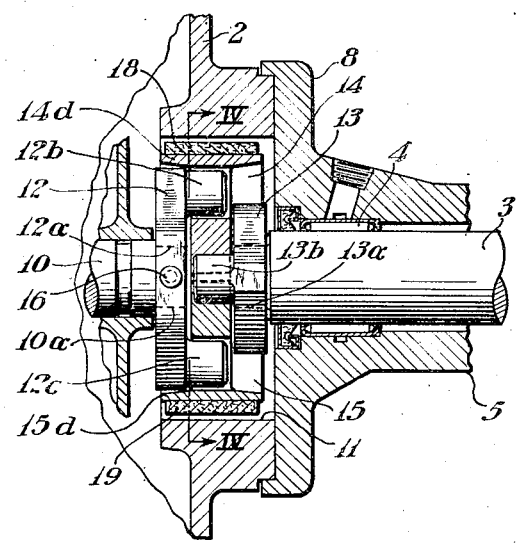
Figure 4:
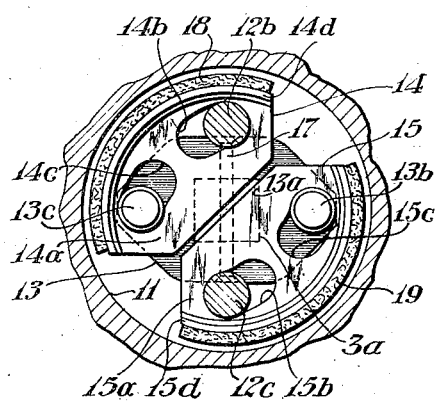
Figure 5:
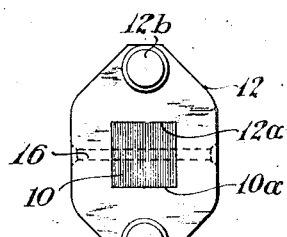

In the accompanying drawing, Figs. 1 and 2 are front elevational and top plan views, respectively, showing a highway crossing gate arm connected with a gate operating mechanism by means of a coupling embodying my invention. Fig. 3 is an enlarged vertical sectional view of the coupling embodying my invention. Fig. 4 is a sectional view taken substantially on the line IV—IV of Fig. 3. Fig. 5 is a view showing the coupling member 12 in place on the shaft 10.

Similar reference characters refer to similar parts in each of the several views.

Referring first to Figs. 1 and 2, I have here shown a coupling embodying my invention arranged to connect a highway crossing gate arm 1 with an operating mechanism 2. The gate arm 1 is of the type which is adapted to descend by gravity to its lowered or traffic obstructing position, and to be subsequently moved to its raised or non-traffic obstructing position by means of the operating mechanism, and as here illustrated it is secured to the outer end of an operating shaft 3 journaled in suitable bearings 4 mounted in a supporting bracket 5. The bracket 5, in turn, is secured in any suitable manner as by means of U-bolts 6 to a signal pole or mast 7, and is provided at the end opposite to the gate arm with a flange 8 to which the operating mechanism 2 is bolted. It will be seen, therefore, that the bracket 5 serves as a means for securing both the gate arm and the operating mechanism to the supporting pole 7. To prevent the gate arm from developing excessive torque when it is descending, suitable counterweights 9 are provided in accordance with the usual practice.

The operating mechanism 2 may be of any preferred type which, when energized, will move the gate arm against its bias to its raised position and hold it there, but which when deenergized will permit the gate arm to descend by gravity to its lowered position. As here shown, this mechanism is similar to that shown and described in Letters Patent of the United States No. 1,138,087 granted to John P. Coleman on May 4, 1915, for a Railway signal, and inasmuch as this mechanism in itself forms no part of my present invention, and is described in detail in the said Coleman patent, it is believed to be sufficient for purposes of the present disclosure to point out that this mechanism includes a main shaft 10 which is disposed in axial alignment with the shaft 3, and which is connected with an electric motor not shown through suitable ratchet mechanism in such manner that when the motor is energized it will rotate the shaft 10 in a counterclockwise direction as viewed from the right in Fig. 3 through a sufficient angular distance to move the crossing arm from its lowered to its raised position, and that when the arm reaches its raised position the ratchet mechanism will permit the motor armature to coast to a stop without shock. This mechanism also includes an electromagnet which becomes energized when the motor becomes energized, and which is effective when energized to hold the shaft 10 in any position to which it is rotated by the motor, but which when deenergized permits the shaft to rotate in the opposite direction from that which it is driven by the motor and to rotate the motor. The mechanism further includes suitable circuit controlling contacts for deenergizing the motor when the crossing arm reaches its full raised position without deenergizing the electromagnet, and for short-circuiting the motor to cause it to act as a brake when the motor is being driven by the descending gate arm.

The coupling embodying my invention in the particular application illustrated operatively connects the two shafts 10 and 3, and is disposed within a cylindrical opening 11 formed in the rear wall of the operating mechanism 2. As shown in the drawing, the coupling comprises a main coupling member 12, a main coupling member 13 and two link members 14 and 15. The member 12 is provided with a square hole 12a which receives the squared end 10a of the shaft 10 and with two diametrically opposite laterally projecting pins 12b and 12c, and is pinned to the shaft 10 by means of a pin 16. The member 13 is similar to the member 12 and is provided with a square hole 13a which receives the squared end 3a of the shaft 3, and with two diametrically opposite laterally projecting pins 13b and 13c, and is secured to the shaft 3 by means of a pin 17. The squared ends of the shafts 10 and 3 are so arranged that when these shafts occupy the proper relative operating positions, the four pins 12b, 13b, 12c and 13c will be disposed at the four corners of a rectangle in the order named, as shown in Fig. 4.

The link member 14 comprises a central web portion 14a provided with two cam slots 14b and 14c which receive the pins 12b and 13c, respectively, of the two coupling members 12 and 13, and an arcuate outer portion 14d to which a brake lining 18 of suitable friction material is fitted for cooperation with the wall of the opening 11. The link member 15 similarly comprises a central web portion 15a provided with two cam slots 15b and 15c which receive the pins 12c and 13b, respectively, of the two coupling members 12 and 13, and an arcuate outer portion 15d to which a brake lining 19 of suitable friction material is fitted for cooperation with the wall of the opening 11.

The operation of the coupling is as follows: The cam slots are so constructed and the parts are so proportioned that when the shaft 10 is rotated by the operating mechanism in the proper direction to raise the gate arm 1, or the shaft 3 is rotated in the direction it is rotated when the gate arm is descending by gravity, the pins 12b, 13b, 12c and 13c will each cooperate with the associated cam slot to force the links inwardly to the positions in which the brake linings are out of engagement with the wall of the opening 11, and it will be apparent, therefore, that when the motor is being operated to raise the gate arm, or the gate arm is descending by gravity, the coupling will transmit torque directly from the one shaft to the other without any frictional force being exerted on either shaft due to the brake linings. If, however, a force is applied directly to the shaft 3 tending to rotate the shaft in the opposite direction from that in which it is rotated to lower the gate arm, as will be the case if someone attempts to raise the gate arm by hand, or if a vehicle collides with the gate when it is lowered and breaks it off so that the counterweights 9 tend to drop suddenly, the pins 12b, 13b, 12c and 13c will then cooperate with the associated cam slots to force the links outwardly to the positions in which the brake linings 18 and 19 frictionally engage the wall of the opening 11, and under these latter conditions the coupling will function to oppose the rotation of the shaft. The force exerted by the coupling under these latter conditions will depend upon the characteristics of the brake linings used and the angles at which the cam slots are disposed in the two link members, and it will be apparent that by choosing the proper lining material and the proper cam angles the coupling can be made to act either as a positive lock against rotation of the shaft 3 in one direction by a force applied directly thereto, or merely as a means for limiting the amount of force necessary to rotate this shaft, or as a means for limiting its rate of movement or both. In the latter case, the crossing gate arm could be raised by hand in an emergency, although the braking effort exerted by the coupling would still be sufficient to retard the fall of the counterweight and thus prevent damage to the operating mechanism, in the event that a car ran into the gate arm and broke it off.

It should be pointed out that the coupling will also function to prevent rotation of the shaft 10 in a direction opposite to that in which it is rotated by the operating mechanism in response to a force applied directly to this shaft, in the same manner it functions to prevent rotation of the shaft 3 in the event an attempt is made to raise the gate arm by hand, or the gate arm becomes broken off. This latter operation of the coupling is not utilized in the particular application illustrated in the drawing, but it should be distinctly understood that couplings embodying my invention are not limited to this application, and that this operation might be useful in other applications which could be made of the coupling.

Although I have herein shown and described only one form of coupling embodying my invention, it is understood that various changes and modifications may be made therein within the scope of the appended claims without departing from the spirit and scope of my invention.

Having thus described my invention, what I claim is:

1. In combination, a fixed part provided with a cylindrical opening, two shafts extending into said opening in axial alignment, two coupling members pinned to said two shafts respectively and provided with laterally projecting pins, and two other members provided with brake linings adapted to at times frictionally engage the wall of said opening and each provided with cam slots each of which slots receives a pin on a different one of said first mentioned members, said slots being so shaped that rotation of the one shaft in one direction will act through said pins and slots to pull said other members to positions in which said linings are clear of said wall, but that rotation of said one shaft in the opposite direction by a force not transmitted from the other shaft will act through said pins and slots to force said other members outwardly to braking positions in which said linings will frictionally engage said wall to oppose rotation of said one shaft.

2. In combination, a fixed part provided with a cylindrical opening, two axially aligned shafts extending into said opening, two coupling members one secured to the end of each shaft and each provided with a pair of laterally projecting pins, two links each provided with a central web portion and an arcuate outer portion faced with a lining of friction material which is adapted to at times frictionally engage the wall of said opening, and two inclined cam slots formed in the web portion of each link and each receiving a pin on each of said members, said slots being so shaped that a torque applied to the one shaft in one direction will act through said pins and slots to pull said links inwardly to positions in which said linings are clear of said wall and to cause corresponding rotation of the other shaft, but that a torque applied to said one shaft in the opposite direction independently of the other shaft will act through said pins and slots to force said links outwardly to positions in which said linings will frictionally engage the wall of said opening and oppose the rotation of said one shaft.

3. In combination, a fixed part provided with a cylindrical opening, two shafts extending into said opening, two coupling members pinned to said two shafts respectively and each provided with a laterally projecting pin, and a third member adapted to at times frictionally engage the wall of said opening and provided with two cam slots each of which receives a different one of said pins, said slots being so shaped that rotation of the one shaft in one direction will act through said pins and slots to pull said third member to a position in which it is out of frictional engagement with said wall, but that rotation of said one shaft in the opposite direction by a force not transmitted from the other shaft will act through said pins and slots to force said third member outwardly to a braking position in which it will frictionally engage said wall to oppose rotation of said one shaft.

4. In combination, a fixed part provided with a cylindrical opening, two shafts extending into said opening, two coupling members secured to said two shafts respectively and provided with laterally projecting pins, and two other members provided with means adapted to at times frictionally engage the wall of said opening and each provided with cam slots each of which slots receives a pin on a different one of said first mentioned members, said slots being so shaped that rotation of the one shaft in one direction or rotation of the other shaft in the other direction by a force applied directly thereto will act through said pins and slots to pull said other members to positions in which said members are out of frictional contact with the wall of said opening, but that rotation of either shaft in the opposite direction by a force not transmitted from the other shaft will act through said pins and slots to force said other members outwardly to braking positions in which they frictionally engage said wall to oppose rotation of such rotated shaft.

5. In combination, a fixed part provided with a cylindrical opening, two shafts extending into said opening, a plurality of members provided with means adapted to at times frictionally engage the wall of said opening, and means including pin and slot connections for connecting said two shafts with all of said members in such manner that rotation of the one shaft in one direction will act through said pin and slot connections to pull said members to positions in which they are out of frictional engagement with said wall, but that rotation of said one shaft in the opposite direction by a force not transmitted from the other shaft will act through said pin and slot connections to force said members to positions in which said members will frictionally engage said wall to oppose rotation of said one shaft.

EDWIN G. LITTLE.